United States Patent [19]

Nelson, II

[11] Patent Number: 5,267,714
[45] Date of Patent: Dec. 7, 1993

[54] FUEL TANK HANGER STRAP

[75] Inventor: Richard E. Nelson, II, East Grand Rapids, Mich.

[73] Assignee: Sparton Corporation, Jackson, Mich.

[21] Appl. No.: 909,619

[22] Filed: Jul. 7, 1992

[51] Int. Cl.⁵ ............................................. A47K 1/00
[52] U.S. Cl. ................................. 248/222.2; 24/590; 248/223.4
[58] Field of Search .............. 24/590, 591, 700, 701; 248/222.2, 222.3, 74.3, 220.2, 221.3, 223.4, 224.4, 225.1; 280/834

[56] References Cited

U.S. PATENT DOCUMENTS

| | | |
|---|---|---|
| 1,405,516 | 2/1922 | Humphreys . |
| 1,893,537 | 1/1933 | Cruze . |
| 3,290,743 | 12/1966 | Hanson . |
| 3,894,707 | 7/1975 | Heard ................... 248/231 |
| 4,094,487 | 6/1978 | Heard ................... 248/231 |
| 4,367,572 | 1/1983 | Zielenski ............... 24/301 |
| 4,483,502 | 11/1984 | Fast .................. 248/220.2 X |
| 4,524,495 | 6/1985 | Hess ...................... 24/590 |
| 5,148,582 | 9/1992 | Dennis, Jr. ............ 24/590 |

OTHER PUBLICATIONS

General Motors' Tank Strap Assembly Drawing, DTD. 09 Mar. 1989.

*Primary Examiner*—Ramon O. Ramirez
*Attorney, Agent, or Firm*—Reising, Ethington, Barnard, Perry & Milton

[57] ABSTRACT

An interlocking fastener and fastening arrangement is disclosed which is particularly suited for attaching a fuel tank hanger strap to a supporting structure on the underbody of an automobile. The fastener can be formed as a unitary end portion of the hanger strap and includes a neck portion and a fastening head from which a pair of unitary tabs extend. The fastener is inserted into an opening in a support and the tabs are then inserted into corresponding slots in the support to thereby reduce the risk of inadvertent disconnection when tension is removed from the fastener. Also disclosed is a bracket for interconnecting with the fastener. The bracket has a pair of spaced, protruding ribs, each having a slot therein. The fastener is inserted between the ribs, rotated to align the tabs with the slots, and then pulled backwards to insert the tabs into the slots.

11 Claims, 2 Drawing Sheets

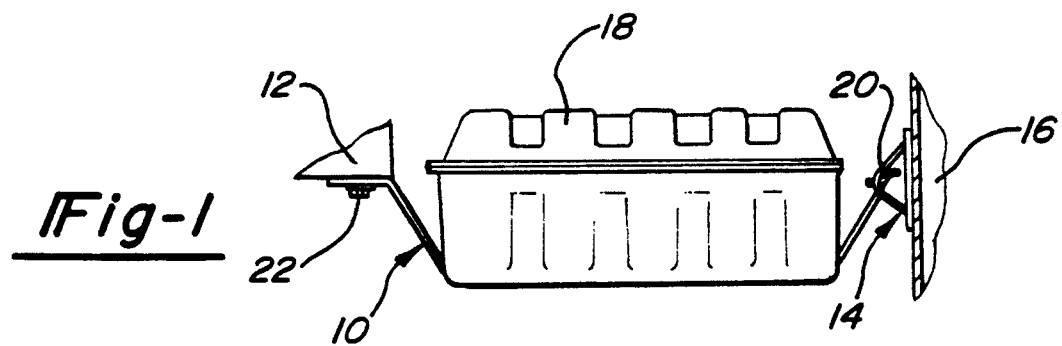
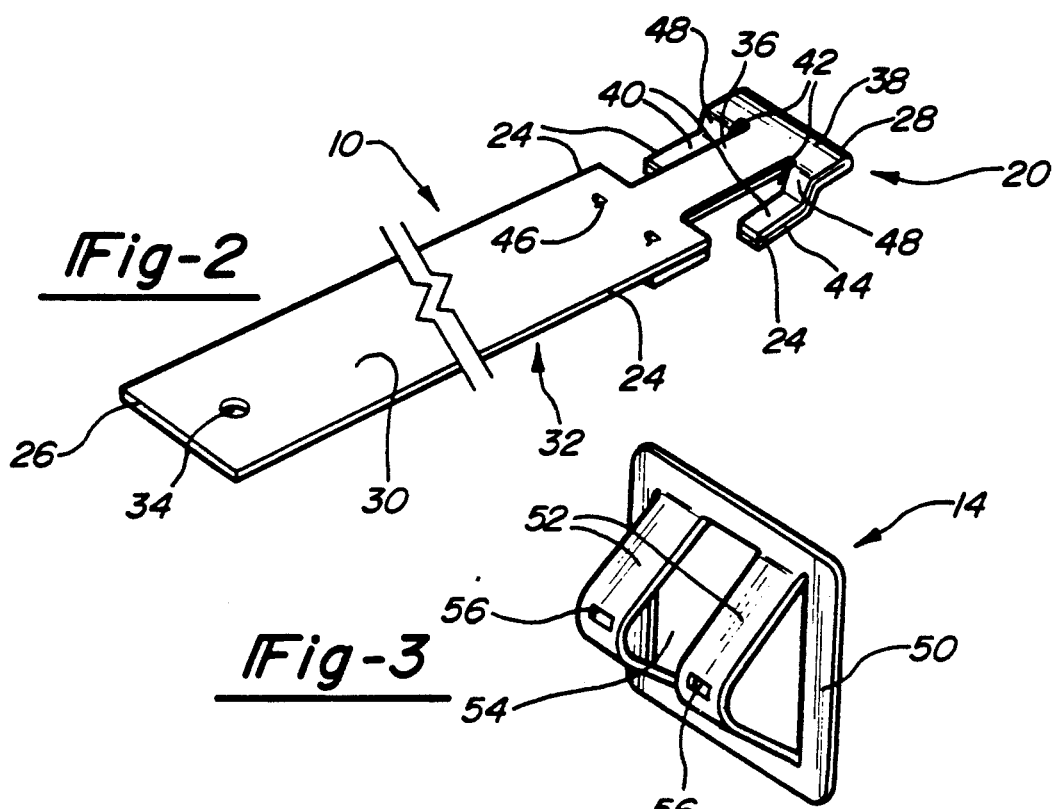
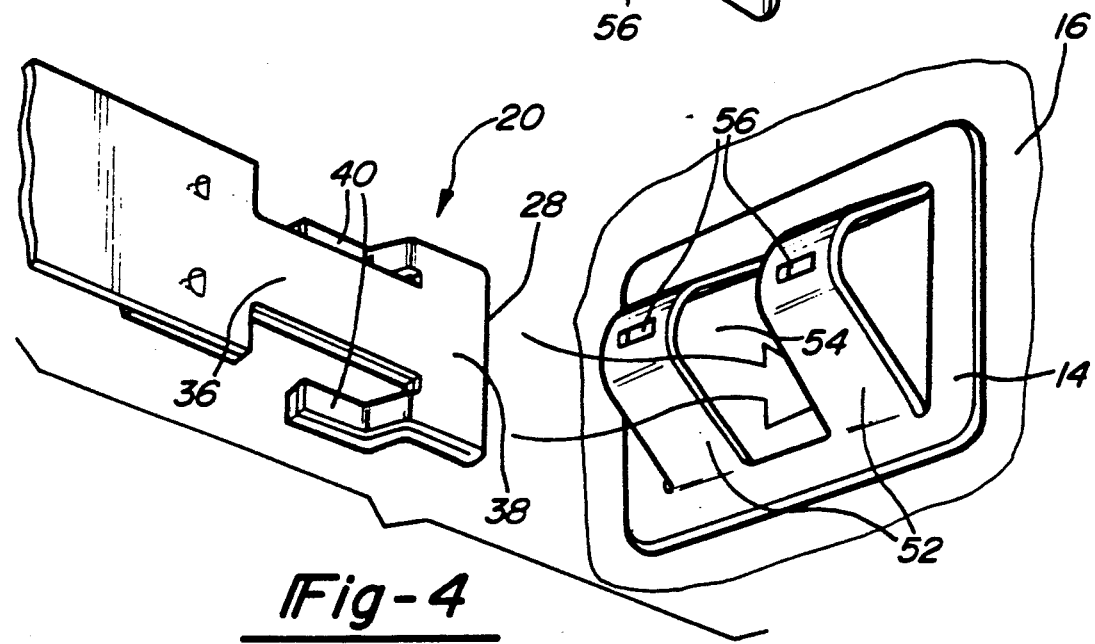

FUEL TANK HANGER STRAP

BACKGROUND OF THE INVENTION

1. Field of the Invention

The present invention relates generally to interlocking fasteners and, more particularly, to automotive fuel tank hanger straps used to secure fuel tanks to automobile underbodies.

2. Description of the Related Art

Automotive fuel tanks are generally supported and attached to the automobile underbody by a pair of hanger straps. These straps extend from underneath the fuel tank to supporting members located on either side of the fuel tank. Often the fuel tank sits in a saddle to protect it from being inadvertently punctured. Channels formed in the bottom of the saddle help locate the straps underneath the saddle and prevent lateral movement of the straps.

Typically, each of the straps have a bolt hole at one end and a somewhat T-shaped fastening head at the other end. This head is connected to the remainder of the strap by a narrower neck portion. The fastening head is designed to be slipped through an opening in the supporting member so that the neck is within the opening. The strap is then shifted slightly to move the neck to a narrower portion of the opening so that shoulders on the head engage the backside surface of the supporting member to prevent removal of the head under tensioning of the strap. The fastening head thereby locks its end of the strap in place. The remaining free end of the strap is then secured to the same or another supporting member via a bolt inserted through the bolt hole. By designing the length of the strap between the fastening head and the bolt hole to be slightly less than the length of the path along which the strap extends, the strap can be tensioned upon tightening of the bolt to prevent the head from moving to the larger portion of the opening and thereafter slipping out of the opening.

The use of a fastening head at one end is preferable to securing that end by a separate bolt and nut because it reduces the number of parts required and simplifies assembly of the automobile. One end of the strap is connected to the automobile underbody simply by slipping the fastening head into the opening, rather than having to align clearance holes in the strap and supporting member through which a bolt must then be inserted and secured by a nut on the backside of the supporting member.

Usually, the fastening head is a unitary portion of the strap and is formed from within the longitudinal margins of the strap to reduce the amount of scrap material produced during manufacturing. The dimensions of the head and neck are selected in accordance with a variety of factors, such as the material used and the expected maximum and cyclic stresses.

One problem which arises with these fastening arrangements is that they do not provide as good protection against inadvertent disconnection of the straps from the supporting members as does a separate bolt and nut assembly. More specifically, if a strap momentarily loses its tension, the fastening head and neck of the strap could slip back to the larger part of the opening in the supporting member through which the head could then slip out. Thus, it would be advantageous to provide a fuel tank hanger strap which includes a fastening arrangement that provides a greater degree of protection against inadvertent disconnection than prior fastening arrangements.

Examples of fasteners designed for other applications are disclosed in U.S. Pat. Nos. 1,405,516, issued Feb. 7, 1922 to C. A. Humphreys, 1,893,537, issued Jan. 10, 1933 to G. R. Cruze, 3,290,743, issued Dec. 13, 1966 to M. P. Hanson, 3,894,707, issued Jul. 15, 1975 to R. A. H. Heard, 4,094,487, issued Jun. 13, 1978 to R. A. H. Heard, and 4,367,572, issued Jan. 11, 1983 to A. L. Zielenski. However, none of these patents provide a fastening arrangement to address the aforementioned problems peculiar to fuel tank hanger straps.

SUMMARY OF THE INVENTION

The present invention provides a fuel tank strap fastening arrangement which is simple to install, yet interlocks securely to reduce inadvertent disconnection when tension is removed from the strap. This is accomplished by a fuel tank strap which has at one end a novel fastener. The fastener includes a transverse edge of the strap and one or more unitary tabs which extend away from the transverse edge. In the preferred embodiment, the fastener includes a pair of tabs formed from within the margins of the strap and which extend out of the plane of the strap along opposite longitudinal edges of the strap for a first distance and then parallel to the plane of the strap for a second distance.

The fastener mates with a support having an opening for insertion of the fastener therein and one or more slots for receiving a corresponding tab on the fastener. The fastener can be interlocked with the support by inserting the fastener into the opening in the support from a front side thereof, moving the fastener to align the tabs and slots, and inserting the tabs into the slots from the backside of the support. The tabs therefore extend through the support from its backside so that the ends of the tabs are on the front side of the support. Removal of the fastener from the support is simply the reverse procedure. This fastening arrangement substantially reduces the risk of the fastener inadvertently disconnecting with the support due to a loss in tension of the strap because to be removed, the strap must be moved farther into the support to disengage the tabs from the slots. That is, more than the removal of tension in the strap is necessary to disconnect the fastener from its support—the strap must also be moved in a direction opposite that in which it is normally tensioned by a distance sufficient to disengage the tab from the slots.

As added protection against inadvertent disconnection of the fastener and support, the fastener and the opening in the support can be designed such that once the fastener is inserted into the opening it must be rotated at least slightly to align and insert the tabs within the corresponding slots. To become disconnected, the fastener must not only move in a direction generally opposite the tensioning of the strap, but must thereafter be rotated by a predetermined amount before it can be withdrawn through the opening.

The opening and slots for receiving the fastener can be formed in any support having sufficient clearance on its backside to accommodate the head of the fastener when inserted through the opening. An alternative embodiment of the invention is provided for use where formation of an opening and slots in the support is undesirable or where the necessary clearance does not exist. This embodiment includes the preferred embodiment of the fastener and a bracket suitable for mating with the fastener. The bracket includes a planar base for mounting the bracket to a supporting structure and a pair of spaced, protruding ribs defining the opening therebetween. The ribs span opposing edges of the base and each contain a slot for receiving a corresponding tab on the fastener.

To interlock the fastener and the bracket, the fastener is first rotated so that the plane of the fastener is nearly parallel to the direction in which the ribs of the bracket extend. The fastener is then inserted into the opening in the bracket until the tabs pass beyond at least the outermost portion of the ribs. The fastener is then rotated until the tabs are aligned with the corresponding slots in the ribs of the bracket. The tabs are then seated within the corresponding slots by pulling the fastener in a direction generally opposite that in which it was moved during its insertion into the opening.

BRIEF DESCRIPTION OF THE DRAWING

The preferred exemplary embodiments of the present invention will hereinafter be described in conjunction with the appended drawings, wherein like designations denote like elements, and:

FIG. 1 is an elevational view showing a fuel being secured between two supporting members by a fuel tank strap of the present invention;

FIG. 2 is a perspective view of the preferred embodiment of the fuel tank strap of the present invention;

FIG. 3 is a perspective view of a bracket of the present invention suitable for mating with the fuel tank strap of FIG. 2;

FIG. 4 is a perspective view showing the first step in mating the fuel tank strap with the bracket;

DESCRIPTION OF THE PREFERRED EMBODIMENT

Figure 5:
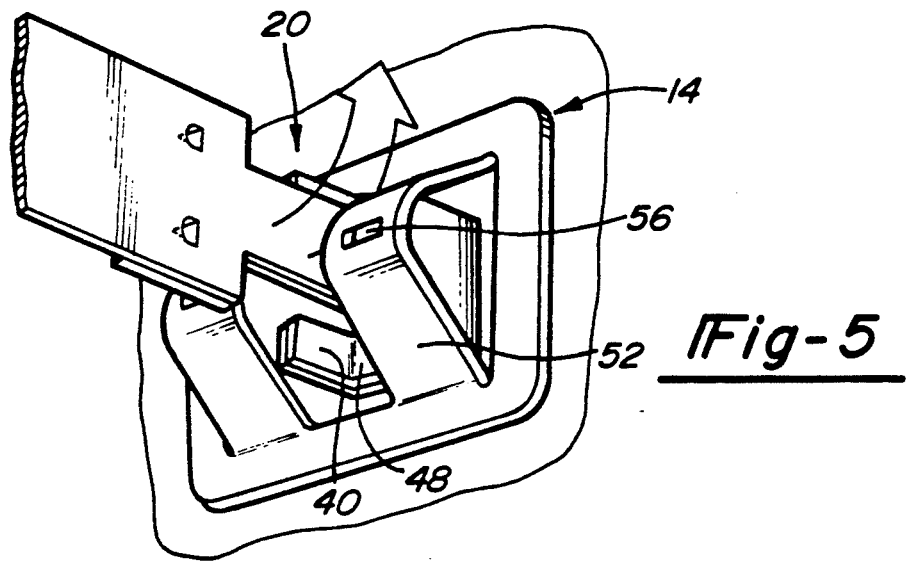
FIG. 5 is a perspective view showing the second step in mating the fuel tank strap with the bracket.

As shown in FIG. 1, a fuel tank strap 10 of the invention extends from a first supporting structure 12 to a bracket 14 of the invention located on a second supporting structure 16 to thereby support a fuel tank 18. A second strap (not shown) shares the weight of fuel tank 18 with strap 10. Strap 10 includes an end portion or fastener 20 at one end thereof which mates with bracket 14 to securely fix the one end of strap 10 in place. A bolt 22 is inserted through strap 10 and support 12 at the other end of strap 10 and is securely threaded into a nut (not shown). Preferably, the length of strap 10 between the fastener 20 and bolt 22 is slightly less than the length of the path along which strap 10 extends, i.e., the path defined from bracket 14, down along the bottom of tank 18, and up to support 12. Thus, when bolt 22 is tightened, strap 10 will be tensioned to securely hold tank 18 to the underbody of the automobile and to decrease the risk of inadvertent disconnection of fastener 20 from bracket 14.

Referring now to FIG. 2, strap 10 is a generally planar member having longitudinal edges 24, a first transverse edge 26, a second transverse edge 28, an upper surface 30, and a lower surface 32. Tank 18 rests upon one of the surfaces 30, 32 when strap 10 is assembled to the underbody of an automobile. Strap 10 is substantially rectangular in shape, having as its margins longitudinal edges 24 and transverse edges 26 and 28. Strap 10 includes fastener 20 at one end thereof and a clearance hole 34 at its other end for accepting bolt 22. Although the particular dimensions of strap 10 are selected in accordance with various considerations known to those skilled in the art, longitudinal edges 24 are generally much longer than transverse edges 26 and 28.

Fastener 20 of strap 10 includes a neck portion 36 extending from the remainder of strap 10 and a fastening head 38 which includes transverse edge 28 and a pair of tabs 40 extending away from transverse edge 28. Tabs 40 extend from head 38 along longitudinal edges 24. Tabs 40 are spaced from neck 36 by a gap 42 which permits fastener 20 to be interlocked with bracket 14, as will hereinafter be explained in greater detail. For added structural integrity, strap 10 is folded back upon itself at transverse edge 28 to define a reinforcing layer 44. Fastener 20 therefore has a thickness equal to twice the thickness of the remainder of strap 10. Reinforcing layer 44 is secured to the remainder of strap 10, as shown by numeral 46, by staking, spot welding or other suitable means to thereby prevent layer 44 from separating from the remainder of strap 10.

Preferably, tabs 40 extend out of the plane of strap 10 for a first distance and then extend substantially parallel to the plane of strap 10 for the remainder of their length. As shown in FIG. 2, this provides tabs 40 with contacting surfaces 48 which engage the backside of bracket 14 to resist the tension introduced in strap 10 when strap 10 is secured at its other end by bolt 22. Contact surfaces 48 are preferred because they operate to spread the force of the tension in strap 10 over a greater portion of bracket 14. However, fastener 20 can be made without contacting surfaces 48, as in the case, for example, of tabs 40 being formed to lie within the plane of strap 10.

As can be understood by reference to FIG. 2, tabs 40 are located within the margins of strap 10 and can therefore be advantageously formed by striking or punching a metal blank. Such an operation simultaneously produces neck 36 so that head 38, including tabs 40, and neck 36 form a unitary structure with the remainder of strap 10. The only scrap produced by manufacturing strap 10 in this manner is that which must be removed from neck 36 or tabs 40, or both, to form gaps 42.

Referring now to FIG. 3, bracket 14 includes a substantially planar base or rim 50 and a pair of protruding ribs 52 extending from opposing lengthwise edges of rim 50. Ribs 52 are spaced to define an opening 54 therebetween. Preferably, ribs 52 are disposed proximate a different one of the transverse edges of rim 50. In a central region of each of ribs 52 there is provided one of a pair of slots 56 which are sized to accept tabs 40. Rim 50 is attached to support 16 by welding or otherwise. Ribs 52 should protrude out of the plane defined by rim 50 by a sufficient distance such that when bracket 14 is mounted upon a flat surface, such as support 16 of FIG. 1, fastener 20 can be inserted between ribs 52 and thereafter rotated to align tabs 40 with slots 56.

Figure 6:
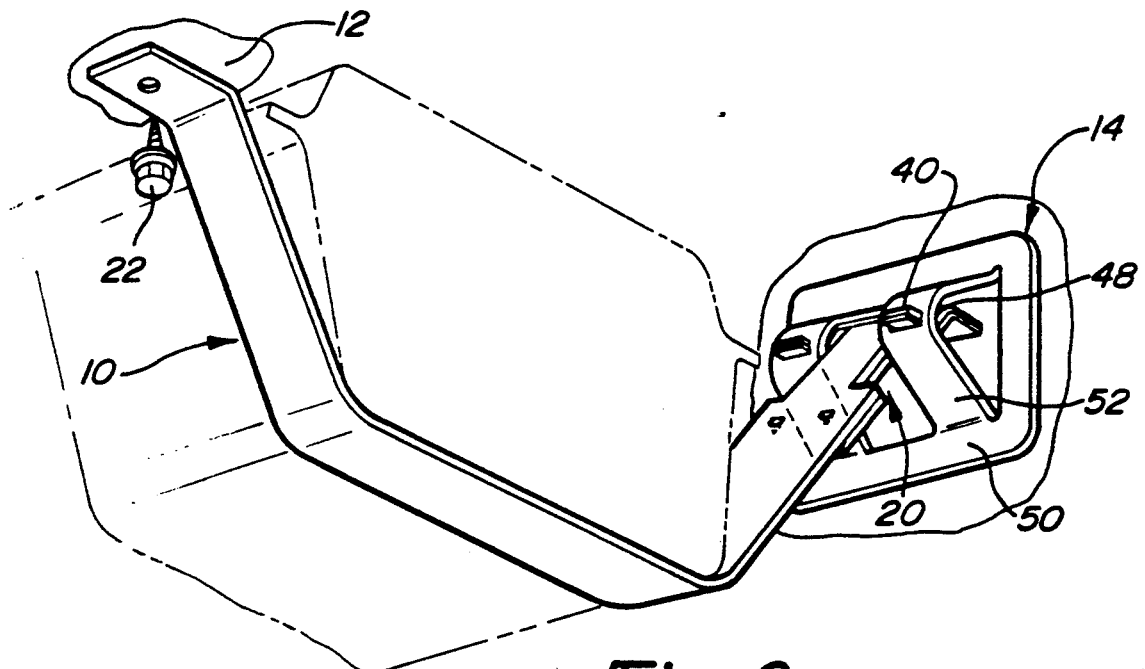
FIG. 6 is a perspective view showing the fuel tank strap interlocked with the bracket.

Interconnection of fastener 20 with bracket 14 can be seen by reference to FIGS. 4 through 6. In FIG. 4, bracket 14 is shown mounted on support 16, as in FIG. 1. To interlock fastener 20 and bracket 14, fastener 20 is rotated so that transverse edge 28 is generally parallel to ribs 52. Head 38, including tabs 40, and neck 36 are then inserted into opening 54, as indicated by the arrow. Turning now to FIG. 5, fastener 20 is then rotated until tabs 40 are aligned with slots 56. Although fastener 20 is shown in FIG. 5 as being rotated in a counter-clockwise direction, it will be appreciated that fastener 20 can suitably be rotated in either direction. Fastener 20 is then pulled away from bracket 14, i.e., moved in a direction opposite the arrow of FIG. 4, until tabs 40 are fully seated within slots 56. Thus, fastener 20 is interlocked with bracket 14 via tabs 40 and slots 56, as shown in FIG. 6. Contacting surfaces 48 of tabs 40 engage the backside of ribs 52 proximate slots 56 to thereafter resist tension applied to strap 10, as when bolt 22 is tightened to hold strap 10 against support 12.

Tabs 40 generally extend through slots 56 in a direction substantially perpendicular to the plane defined by rim 50. However, neck 36 of fastener 20 may be tensioned in a different direction, such as that shown in FIG. 6. If the tension existing in strap 10 is great, fastener 20 may bend at neck 36 as shown in FIGS. 1 and 6 and assume a slightly different conformation than that depicted in FIG. 2.

The interconnection of fastener 20 with bracket 14 or some other supporting structure is advantageous because the extension of tabs 40 through corresponding slots substantially reduces the risk of fastener 20 becoming inadvertently disconnected. More specifically, improved interconnection is provided by the present invention because fastener 20 can only be removed by disengaging tabs 40, which requires moving fastener 20 in a direction opposite that in which it is normally tensioned. Furthermore, if an opening and slot arrangement such as that provided by bracket 14 is utilized, the opportunity for fastener 20 to become disconnected is further reduced because once tabs 40 exit the slots, fastener 20 must then be rotated before it can be removed from the opening.

It is important to note that bracket 14 is not required, fastener 20 being able to effectively mate with any supporting structure having an opening adapted to receive fastener 20 and slots adapted to receive tabs 40. Thus, support 16 can simply be provided with an opening, such as opening 54, and a pair of spaced slots, such as slots 56, and, if there is sufficient clearance behind support 16, no protruding members, such as ribs 52, are needed. Moreover, such an opening would not have to be configured to require rotation of fastener 20 after being inserted therein, but instead can be designed such that tabs 40 could be aligned with the slots simply by offsetting fastener 20 somewhat, the important aspect being that tabs 40 extend through the slots to the front side of support 16 to thereby lock fastener 20 in place. In this regard, there are very little constraints placed on the design of the tabs within the scope of the present invention. Thus, tabs 40 need not be formed from within the longitudinal or lateral margins of strap 10, need not extend from head 38 on the same side of strap 10, and need not extend out of the plane defined by strap 10. Furthermore, fastener 20 can suitably be employed with only a single tab. In any such variation, the supporting structure or bracket would be designed with an opening and slot(s) suitable for the particular variation utilized.

There has thus been provided in accordance with the present invention a novel fastener and fastening arrangement which is particularly suited for use in the attachment of automobile fuel tank hanger straps. However, it will be apparent that fastener 20 will be suitable for any number of a variety of other applications requiring an interlocking fastener of the type that is to be subjected to forces which tend to pull the fastener away from the support with which it interlocks. It should of course be understood that the foregoing description is of preferred exemplary embodiments of the invention and that the invention is not limited to the specific embodiments shown. Various changes and modifications will be obvious to those skilled in the art and all such variations and modifications are intended to come within the spirit and scope of the appended claims.

I claim:

1. A fuel tank hanger strap for mating with a support having an opening which permits insertion of the strap into the support and at least one slot for interlocking engagement with the strap, the strap comprising:
   an elongated, planar member having a pair of opposed longitudinally extending edges and a unitary end portion which includes a transverse edge of said member and a unitary tab, said tab extending away from said transverse edge and being located between said longitudinally extending edges, said end portion being adapted to be insertable into the opening in the support from one side of the support such that said tab is thereafter insertable into the slot from the other side of the support.

2. A fuel tank hanger strap for mating with a support having an opening which permits insertion of the strap into the support and having first and second slots for interlocking engagement with the strap, the strap comprising:
   a longitudinally extending planar member having an end portion which includes a transverse edge of said member and first and second unitary tabs extending away from said transverse edge, said first and second tabs being disposed along opposing longitudinal edges of said member to define therebetween a neck portion of said end portion, said end portion being adapted to be insertable into the opening in the support from one side of the support such that said first and second tabs are thereafter insertable into the slots from the other side of the support, said neck portion being spaced from said first and second tabs by a gap sufficient to permit insertion of said tabs into the slots in the support when said end portion is inserted into the opening in the support.

3. A fuel tank hanger strap as defined in claim 2, wherein said first and second tabs extend out of the plane of said member.

4. A fuel tank hanger strap as defined in claim 3, wherein said first and second tabs are formed from within the margins of said member and extend away from said transverse edge in substantially the same direction.

5. A fuel tank hanger strap as defined in claim 4, wherein said first and second tabs extend out of the plane of said member for a first distance and extend generally parallel to the plane of said member for a second distance.

6. A fuel tank hanger strap as defined in claim 5, wherein said member is folded about said transverse edge, wherein said end portion has a thickness equal to twice the thickness of the remainder of said member.

7. A fuel tank hanger strap as defined in claim 2, wherein said first and second tabs are disposed substantially within the plane of said member and are formed from within the margins of said member.

8. An interlocking fastening assembly, comprising:
   a fastener formed from a generally planar member and having a pair of tabs formed from within the margins of said member along opposed lengthwise edges of said member, said tabs defining a neck portion of said member located therebetween; and a bracket having an opening for inserting said fastener therethrough in a first rotational position and adapted to allow at least slight rotation of said fastener when inserted therein, said bracket including spaced slots for receiving said tabs when said fastener is in a second rotational position within said opening;

wherein said tabs extend out of the plane of said member generally proximate a transverse edge of said member for a first distance and extend generally parallel to the plane of said member in a direction away from said transverse edge for a second distance; and, further wherein said tabs and neck portion are adapted to permit insertion of said tabs within said slots.

9. An interlocking fastening assembly as defined in claim 8, wherein said bracket comprises:

a planar base for mounting said bracket to an object; and a pair of spaced, protruding ribs defining said opening therebetween, each of said ribs spanning opposing edges of said base and having a different one of said slots formed therethrough.

10. An interlocking fastening assembly as defined in claim 9, wherein said base comprises a generally flat, rectangular rim, wherein each of said ribs span the lengthwise edges of said rim proximate a different one of the transverse edges of said rim.

11. A fastener for mating with a support having an opening which permits insertion of the fastener into the support and a pair of slots for interlocking engagement with the fastener, the fastener comprising:

a generally planar member; and a pair of tabs located along opposing lengthwise edges of said member and defining a neck portion of said member located between said tabs, said tabs extending out of the plane of said member generally proximate a transverse edge of said member for a first distance and extending generally parallel to the plane of said member in a direction away from said transverse edge for a second distance;

wherein said member is adapted to be insertable within the opening in the support from one side of the support and wherein said tabs are spaced from said neck portion such that each of said tabs are insertable into a corresponding one of the slots from the other side of the support.

* * * * *